United States Patent [19]

Sachot et al.

[11] Patent Number: 5,894,753
[45] Date of Patent: Apr. 20, 1999

[54] METHOD OF PRODUCING SPLINES ON A SHAFT

[75] Inventors: Christophe Sachot, Villerable; André Laisement, La Chapelle Encherie; Michel Chartrain, Lunay, all of France

[73] Assignee: Lemförder Nacam, Vendome, France

[21] Appl. No.: 08/955,921

[22] Filed: Oct. 22, 1997

[30] Foreign Application Priority Data

Oct. 4, 1996 [FR] France ........................ 96-13103

[51] Int. Cl.⁶ .................................................. B21K 1/00
[52] U.S. Cl. ........................ 72/402; 72/408; 72/370.16; 72/370.04; 29/893.34
[58] Field of Search .................. 72/402, 408, 370.04, 72/370.16, 370.21; 29/893.34, 893.33, 893.3

[56] References Cited

U.S. PATENT DOCUMENTS

| | | | |
|---|---|---|---|
| 1,815,626 | 7/1931 | Lee | 29/893.34 |
| 3,263,474 | 8/1966 | Pentland | 72/402 |
| 3,800,386 | 4/1974 | Bishop | 72/402 |
| 4,800,634 | 1/1989 | Gerstner | 29/893.34 |

FOREIGN PATENT DOCUMENTS

| | | | |
|---|---|---|---|
| 2320798 | 3/1977 | France | 72/402 |
| 1211576 | 3/1966 | Germany | 72/402 |
| 480411 | 2/1938 | United Kingdom | 72/402 |

*Primary Examiner*—Daniel C. Crane
*Attorney, Agent, or Firm*—Laubscher & Laubscher

[57] ABSTRACT

In a method of producing splines on a shaft, cold deformation without removal of chips is effected on the outside face of a small-thickness tube in a single operation. The cold deformation includes hammering the small-thickness tube by a conjugate and simultaneous action of beating and kneading. The depth of the splines can be as much as half the thickness of the tube.

4 Claims, 2 Drawing Sheets

METHOD OF PRODUCING SPLINES ON A SHAFT

BACKGROUND OF THE INVENTION

1. Field of the Invention

The present invention relates to a method of producing splines on a shaft. The method of obtaining splines on a shaft is more particularly intended for use in the manufacture of automobile vehicle steering column shafts.

2. Description of the Prior Art

Methods of producing splines on solid shafts by deformation are known in themselves. Methods of producing splines on the outside of relatively thick hollow shafts by removing material also known in themselves. The first type of method has the disadvantage of applying only to solid shafts if splines are to be produced without removing material. The second kind of method used previously has the disadvantage of necessitating the production of splines by removing chips when splines are to be produced on the outside of a tube, which must also be relatively thick.

OBJECTS OF THE INVENTION

The main object of this invention is to avoid the disadvantages described hereinabove.

Another object of this invention is to provide a method of producing splines on a shaft that does not require any removal of chips and can be applied to the outside of a tube having the smallest possible thickness.

A further object of this invention is to minimize the unit cost of producing the splines.

SUMMARY OF THE INVENTION

According to the invention, a method of producing splines on a shaft by cold deforming an outside face of a small-thickness tube without removal of chips, comprises the steps of:

supporting an inside face of the small-thickness tube by a mandrel having dimensions matched to the inside face, and hammering the outside side in a single operation by a conjugate and simultaneous action of beating and kneading, the splines having a depth substantially at most half the thickness of the tube.

Advantageously, the hammering step uses a number of dies which is a sub-multiple of the number of splines to be produced. Each die has imprints which image the splines to be produced, the imprints having entry and exit angles.

According to the invention, in the method of producing splines on a shaft by applying cold deformation without removing chips to the outside face of the small-thickness tube, the hammering step comprises a step of providing a machine comprising an outer ring which is adapted to be rotated. The outer ring drives pressure rollers which act on plungers. Dies radially extend between respective plungers and the outside face of the tube and are equally spaced about the tube. The plungers and dies are supported and guided by a fixed internal support assembly in which the plungers and dies are slidably mounted. The tube supported by the mandrel is held rotationally stationary. The tube is advanced slowly between said dies when said outer ring is turning during said hammering operation. Each time a pressure roller passes over a plunger, the pressure roller causes radial movement of the plunger and corresponding die thereby deriving an alternating radial movement of each of said dies to produce the splines on the small-thickness tube by the conjugate and simultaneous action of beating and kneading.

Accordingly, the method of the invention for producing splines on a shaft has the advantage of necessitating no removal of chips to produce splines on the outside of a tube with small-thickness. Moreover, the method is carried out in a single operation so that the unit cost of the shaft is very low and the weight of the part is as small as possible, which is of particular benefit in the automobile industry.

BRIEF DESCRIPTION OF THE DRAWINGS

The foregoing and other objects, features and advantages of the invention will be apparent from the following detailed description of several embodiments of the invention with the reference to the corresponding accompanying drawings in which.

DESCRIPTION OF THE PREFERRED EMBODIMENTS

Figure 1:
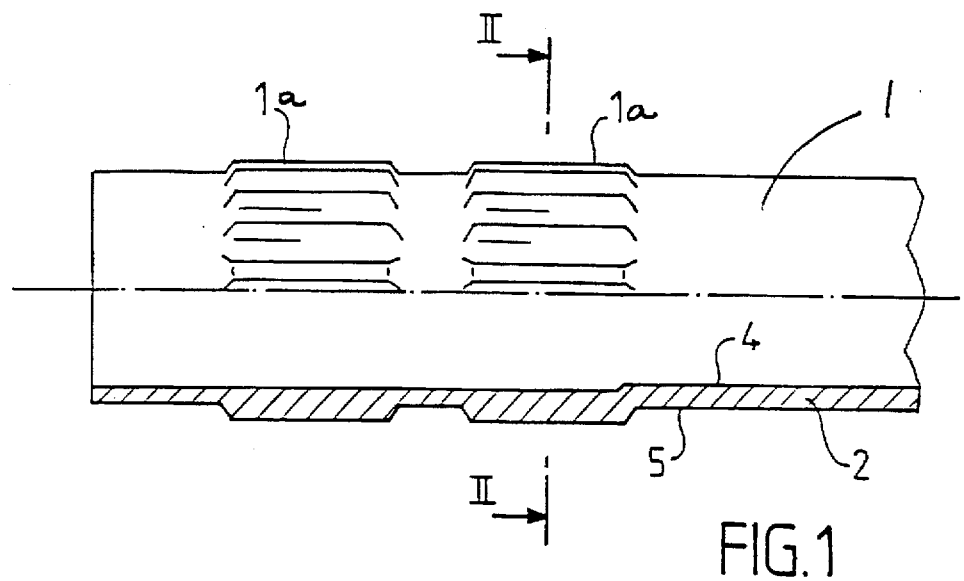
FIG. 1 is a longitudinal view in half axial section of a shaft having splines produced by the method of the invention.
Figure 2:
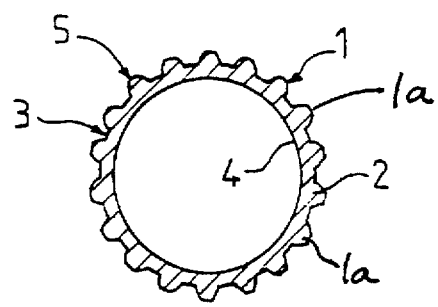
FIG. 2 is a section taking along the line II—II in FIG. 1.

The present invention relates to a method of obtaining splines on a shaft, like that shown in FIGS. 1 and 2.

The shaft is a tube 2 with small-thickness, having an outside face 5 and an inside face 4. In the shaft shown there are two series of splines 1 having a depth 3 which can be as much as half the thickness of the tube 2. This shaft can be the male member of an automobile vehicle steering column, which is slidably coupled to the female member of said steering column.

The method of producing the splines 1 on the tube 2 applies cold deformation, without removal of chips, to the outside face 5 of the thin tube 2. According to one feature of the invention this deformation is obtained in a single operation.

According to the objects of this invention, the splines 1 on the tube 2 with small-thickness are to be produced in order to reduce weight and to reduce the cost of manufacture. The complexity stems from the fact that the thickness of the tube 2 must be as small as possible, to reduce the weight and cost of the part, whilst remaining acceptable in order to be able to raise the material relative to the outer circumferential surface of the tube to produce the spline keys or protrusions 1a between the required splines 1. In accordance with the invention, the depth 3 of the splines 1 can be as much as half the thickness of the tube 2, i.e. substantially at most half the tube thickness.

To guarantee that the splines 1 produced are of good quality, during the hammering operation the inside face 4 of the tube 2 is supported by a mandrel 14 (FIG. 6) which has dimensions matching the dimensions of the inside face 4 of said tube 2.

Figure 3:
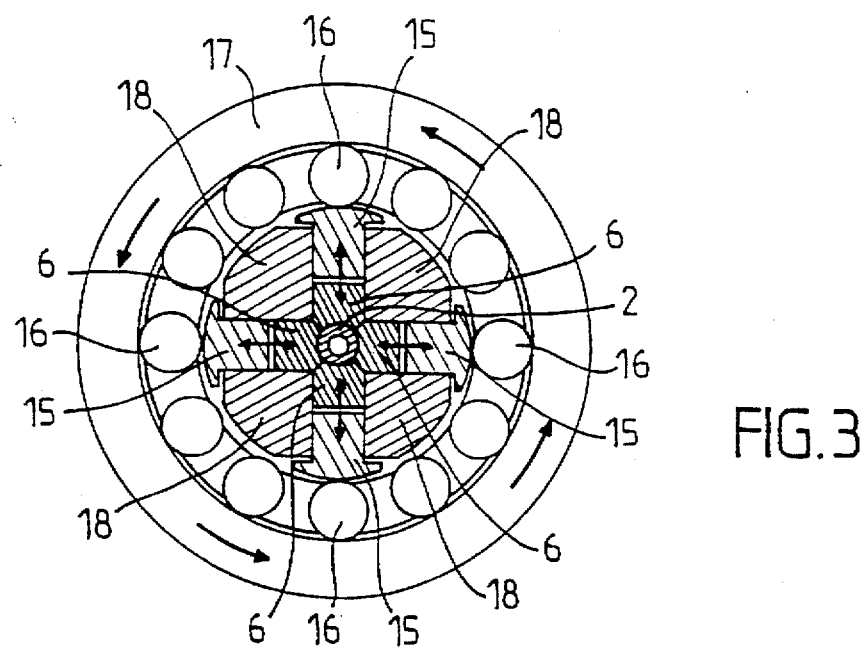
FIG. 3 is a schematic transverse view of the machine using the method of the invention, the fixed internal support assembly, the plungers, the dies and the tube to be produced being in section.

The splines 1 are made on a machine shown schematically in FIG. 3. With an outer ring 17 of this machine rotating, the tube 2 is introduced between dies 6 equally spaced about the tube. The number of dies 6 used to carry out the hammering operation is a sub-multiple of the number of splines 1 to be produced. In the embodiment shown in the figures there are four dies 6 to make sixteen splines 1 on the tube 2.

The tube 2 to be hammered advances slowly during the hammering operation, being prevented from rotating.

The outside ring 17 rotates pressure rollers 16 which cause the dies 6 to radially move each time the pressure rollers 16 pass plungers 15. It is the alternating radial movement which makes the splines 1 on the thin tube 2 by the conjugate and simultaneous action of beating and kneading.

Each plunger 15 is supported and guided by a fixed internal support assembly 18. Each plunger 15 can slide and act on the corresponding die 6, which is slidably mounted in the fixed internal support assembly 18.

Figure 4:
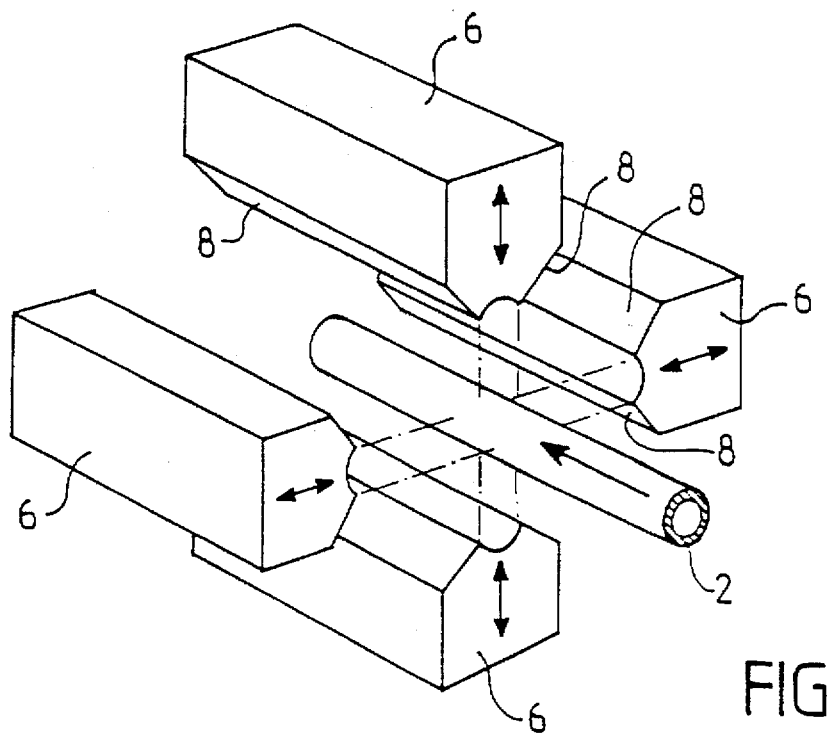
FIG. 4 is a schematic perspective view of the dies and the tube to be produced.
Figure 5:
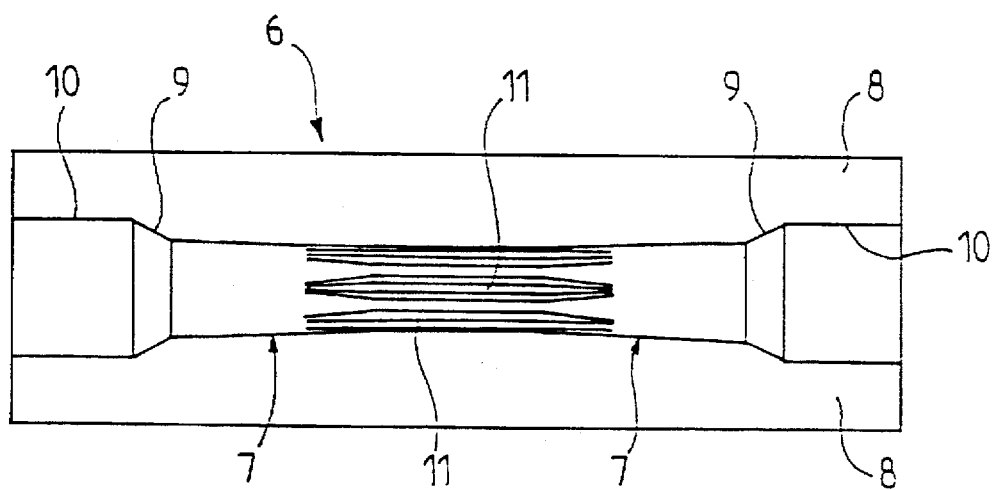
FIG. 5 is a longitudinal view of the working part of a die corresponding to FIGS. 3 and 4.
Figure 6:
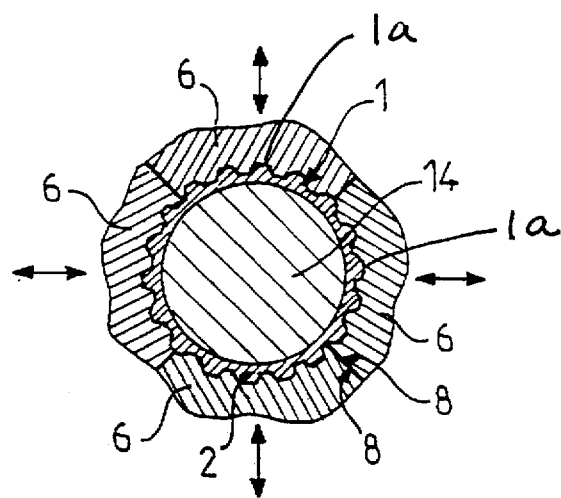
FIG. 6 is a view to a larger scale of the set of dies and the tube to be produced shown in FIG. 3.

The shape of the dies 6 shown in FIGS. 4, 5 and 6 has imprints 11 which image the splines 1 to be produced. Each die 6 has two contact faces 8 which engage the contact faces 8 of the two adjacent dies. The imprints 11 have entry and exit angles 7 that enable the material to move freely when producing the splines 1. Additionally, each die has a cylindrical bearing surface 10 with a conical connecting portion 9 at each end thereof. During the operation, the inside face 4 of the tube 2 is supported by the mandrel 14 in order to prevent the material collapsing.

Thus the method of the invention produces splines 1 on a shaft by applying cold deformation with no removal of chips to the outside face 5 of a tube 2 with small thickness. The method is carried out on a machine that includes outer ring 17 which is rotated. The outer ring 17 drives pressure rollers 16 which act on plungers 15. The plungers 15 are supported and guided by fixed inside support assembly 18 in which each plunger 15 can slide and act on the corresponding die 6. Each die 6 and the corresponding plunger 15 is slidably mounted in the fixed internal support assembly 18. Each time a pressure roller 16 passes over a plunger 15, said pressure roller 16 causes radial movement of the plunger 15 and corresponding die 6 so that the alternating radial movement of each of the dies 6 produces the splines 1 on the tube 2 with small thickness. This is obtained by the conjugate and simultaneous action of beating and kneading. The tube 2 is introduced between the die 6 when the outer ring 17 is rotating and the tube 2 advances slowly during the hammering operation whilst being prevented from rotating and supported by a mandrel 14.

What we claim is:

1. A method of producing splines on the outer surface of a tube (2) having a relatively small thickness by cold deformation without the removal of chips or other material therefrom, comprising the steps of:
    (a) supporting the internal circumferential surface (4) of the tube by a cylindrical mandrel (14) having a uniform outer circumferential surface that corresponds with and is contiguous to the inner circumferential surface of the tube; and
    (b) cold hammering the outer circumferential surface of the tube in a single operation by the conjugate and simultaneous action of beating and kneading without deforming the inner circumferential surface of the tube to produce a plurality of circumferentially spaced splines (1) that are separated by spline protrusions (1a) that are raised relative to the outer circumferential surface of the tube;
    (c) said splines having a depth no greater than one-half the thickness of the tube.

2. The method claimed in claim 1, wherein said cold hammering step uses a number of dies which is a sub-multiple of the number of splines to be produced.

3. The method as claimed in claim 2 wherein each die has imprints which image said splines to be produced, said imprints having entry and exit angles.

4. The method of producing splines as claimed in claim 1, wherein said cold hammering step includes the steps of:
    (1) providing an arrangement comprising an outer ring adapted to be rotated, a plurality of pressure rollers driven by said outer ring, plural plungers against which said pressure rollers are applied, plural dies equally spaced radially about said small-thickness tube and each extending between one respective plunger and said outside face of said small-thickness tube, and fixed internal supporting means in which said plungers and said dies are slidably mounted,
    (2) holding rotationally stationary said small-thickness tube supported by said mandrel,
    (3) rotating said outer ring to drive said pressure rollers,
    (4) advancing slowly axially and radially said small-thickness tube supported by the mandrel between said dies when said outer ring is rotating, and
    (5) passing said pressure rollers over said plungers to move radially said plungers and said dies thereby deriving an alternating radial movement of each of said dies to produce said splines on said small-thickness tube by said conjugate and simultaneous action of beating and kneading.

\* \* \* \* \*

UNITED STATES PATENT AND TRADEMARK OFFICE
CERTIFICATE OF CORRECTION

PATENT NO.   : 5,894,753
DATED        : April 20, 1999
INVENTOR(S)  : Christopher Sachot, et al.

It is certified that error appears in the above-identified patent and that said Letters Patent is hereby corrected as shown below:

ON THE TITLE PAGE:

[30] Foreign Application Priority Date

October 24, 1996 [FR]          France          96-13103

Signed and Sealed this

Fifth Day of October, 1999

Attest:

Q. TODD DICKINSON

Attesting Officer          Acting Commissioner of Patents and Trademarks